Oct. 27, 1970   H. CANCRINUS   3,536,425
POSITIVE DISPLACEMENT DEVICE
Filed Oct. 14, 1968   5 Sheets-Sheet 1

HENDRIK CANCRINUS, Inventor

BY *Wenderoth, Lind & Ponack*
Attorneys

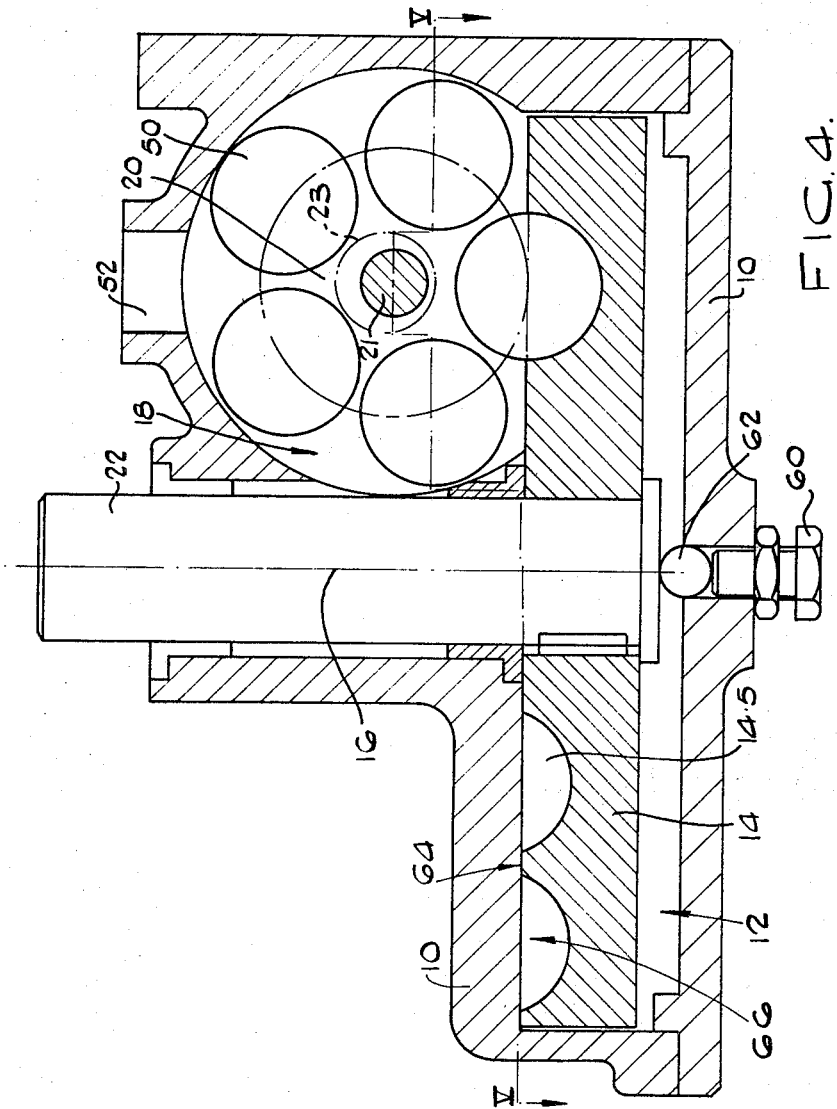

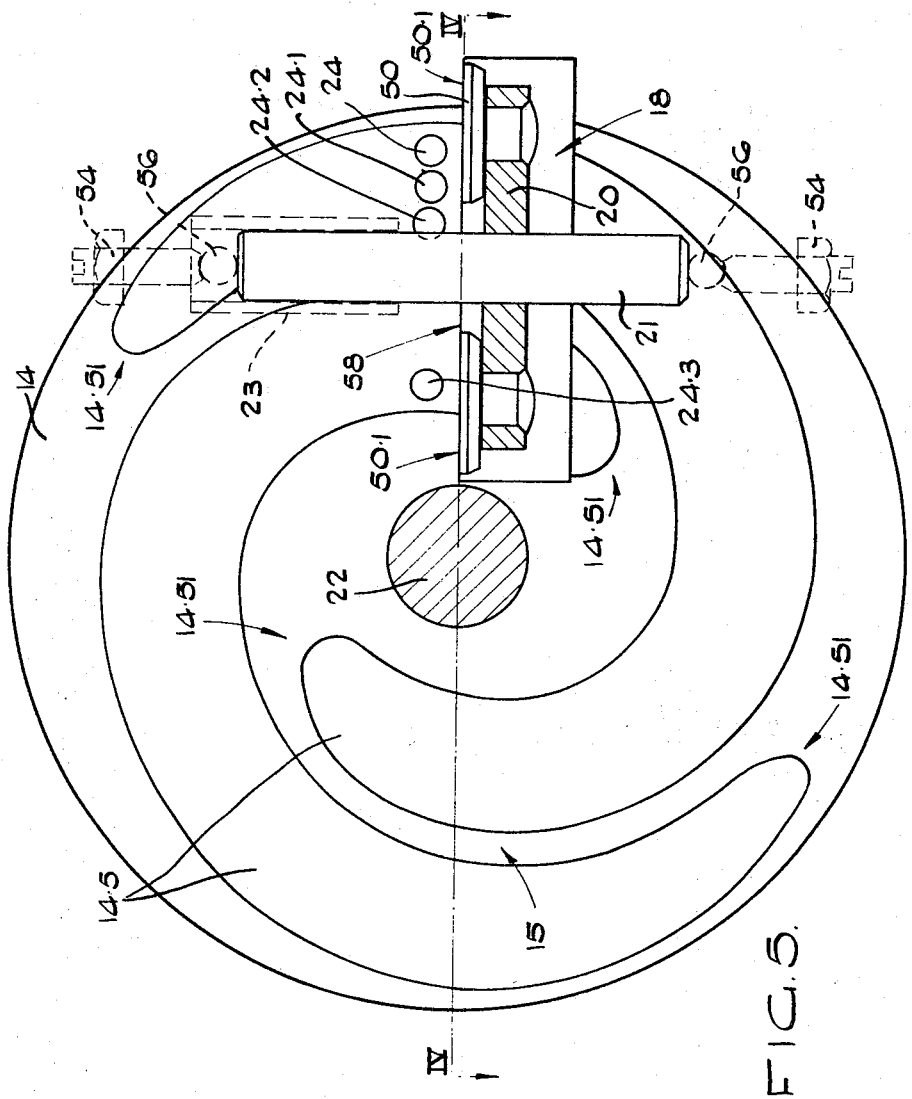

Oct. 27, 1970   H. CANCRINUS   3,536,425

POSITIVE DISPLACEMENT DEVICE

Filed Oct. 14, 1968   5 Sheets-Sheet 5

HENDRIK CANCRINUS, Inventor

BY Wendroth, Lind & Ponack
Attorneys

United States Patent Office 3,536,425
Patented Oct. 27, 1970

3,536,425
POSITIVE DISPLACEMENT DEVICE
Hendrik Cancrinus, Rondebosch, Cape Province, Republic of South Africa, assignor to Helix Devices (Proprietary) Limited, c/o Welby Steward, Bass & Company, Protea, Cape Town, Cape Province, Republic of South Africa
Filed Oct. 14, 1968, Ser. No. 767,414
Claims priority, application Republic of South Africa, Nov. 7, 1967, 67/6,687
Int. Cl. F04c 3/00, 15/04
U.S. Cl. 418—105          15 Claims

ABSTRACT OF THE DISCLOSURE

A rotary positive displacement device which includes a housing having an inlet opening and an outlet opening; a rotor rotatably mounted in the housing and having a helical, spiral, or spiro-helical groove; a stopwheel engaging wormgear fashion with the rotor and preventing free passage of fluid flow along the groove from the one opening to the other.

---

This invention relates to a positive displacement device adaptable for use as a pump or for use as a motor, or for use as a prime mover, making use of a working fluid under pressure.

The applicant is aware of devices of this kind in which a stopwheel engages wormwheel fashion with a rotor mounted in a housing, the stopwheel engaging sealingly with a pair of closely spaced opposed faces in the housing.

It is an object of this invention to provide a device which the applicant believes will be an improvement over existing devices.

According to the invention, a rotary positive displacement device includes a housing having an inlet opening and an outlet opening; a rotor rotatably mounted relative to the housing and having at least one groove which as least one run-out end, the rotor engaging sealingly with the housing along either side of the groove and at the run-out end of the groove; and a stop assembly displaceably mounted relative to the housing and having a plurality of spaced stops; the said groove being adapted when the rotor rotates to come cyclically into communication with at least one of the openings, and a free passage for fluid flow along the groove from one opening to the other being prevented when the rotor rotates relative to the housing, by each stop engaging with the groove profile and with the housing along a single sealing face, the stops being mounted in a space which communicates with one of the openings.

The groove may be arranged to come out of register with one of the openings before it registers with the other of the said openings. The function of the inlet and outlet openings may be reversed. The stop assembly may be a stopwheel rotatably mounted relative to the housing in the said space, the stops being circumferentially spaced on the stopwheel. The stops may be replaceable inserts.

The said space may constitute the said one of the openings with which it communicates. The said space may be a cavity in the housing, the communication with the said one of the openings in the housing being via the groove.

The groove may have an run-out end at its other end as well, the rotor engaging sealingly with the housing also at this run-out end of the groove further to prevent free passage of fluid flow between the openings. Alternatively, the groove may be open-ended at its other end, the said open end of the groove terminating in an opening in the housing which is the said one of the openings in the housing communicating with the said space.

The opening other than the one communicating with the said space, may be adjustable in position relative to the groove to permit variation in the timing of the registration of the groove with one of the openings relative to the other of the openings. The adjustability in position of the opening may be provided by having a plurality of openings spaced apart and usable as alternatives.

Good sealing to ensure prevention of a free passage for fluid flow may be obtained by making the stopwheel adjustable in position relative to the housing. The adjustability may be obtained by making the spacing between the rotor and stopwheel adjustable. The adjustability in the spacing between the rotor and stopwheel may be obtained by mounting the stopwheel rotatably in a member in the housing, the said member being arcuately adjustable in position in the housing about an axis eccentric to the rotational axis of the stopwheel. The adjustability may be provided by urging means adapted to urge the stopwheel axially relative to the housing.

The groove may be one of the group helical, spiral, and spiro-helical.

Further features of the invention will become apparent from the various embodiments which are described hereafter, with reference to the accompanying diagrammatic drawings. These embodiments are given by way of example only.

In the drawings:

FIG. 4 shows a sectional side elevation of a further embodiment of the invention at IV—IV in FIG. 5;

FIG. 5 shows a sectional end elevation of the embodiment of FIG. 4 at V—V in FIG. 4;

Figure 1:
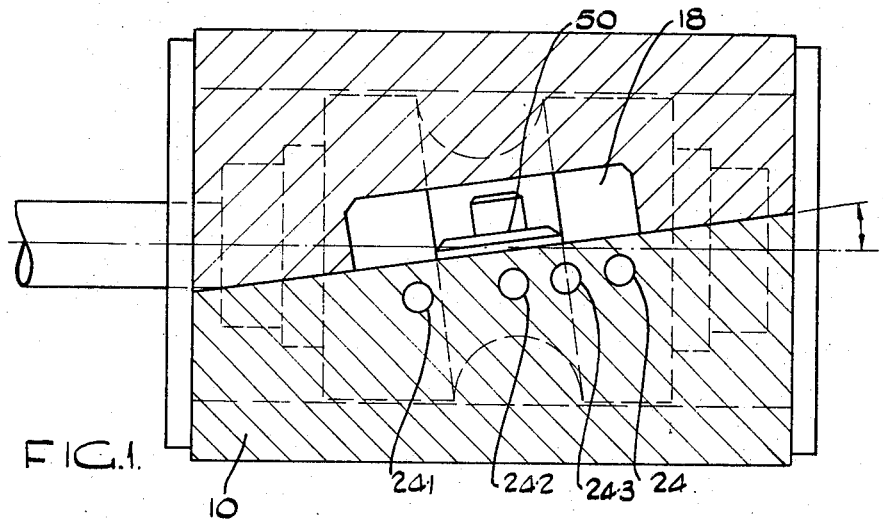
FIG. 1 shows a sectional plan view of one embodiment of the invention at I—I in FIG. 3.
Figure 2:
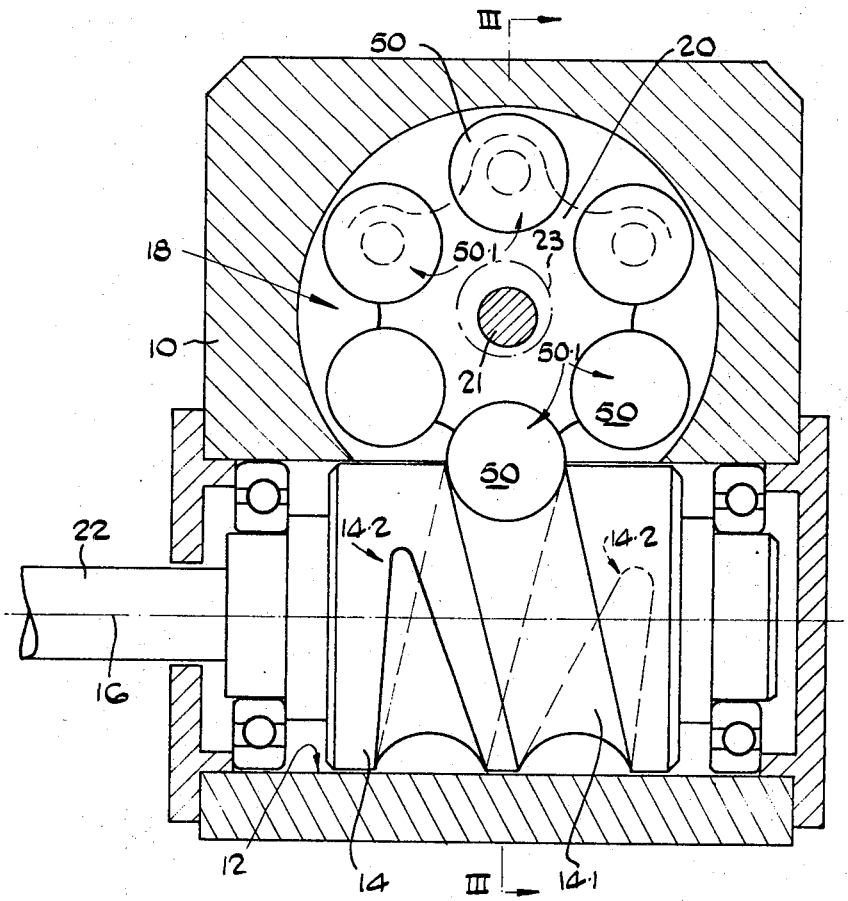
FIG. 2 shows a sectional side elevation of the embodiment of FIG. 1 at II—II in FIG. 3.
Figure 3:
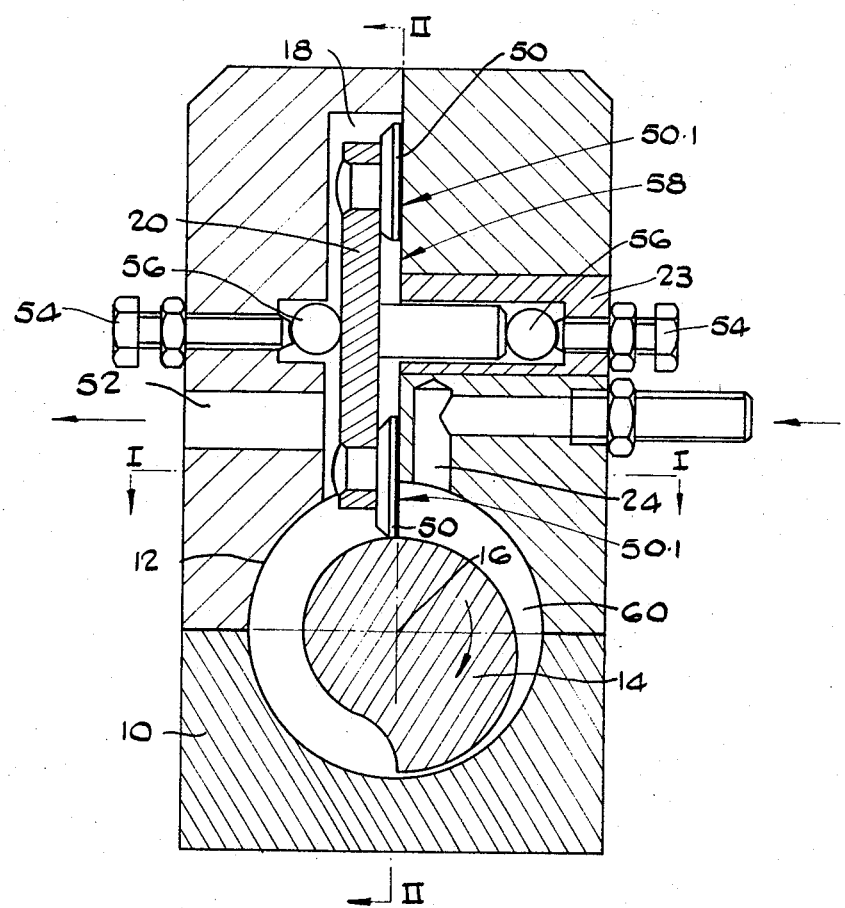
FIG. 3 shows a sectional end elevation of the embodiment of FIGS. 1 and 2 at III—III in FIG. 2.

Referring to FIGS. 1, 2 and 3 of the drawings, reference numeral 10 refers to a housing defining a space 12 within which the worm-like rotor 14 is mounted to rotate about its axis 16. The rotor has a helical groove in the form of a single start groove or thread 14.1. The groove or thread 14.1 has run-out ends 14.2. The housing 10 also defines a cavity 18 within which a stopwheel 20 is mounted to rotate on an axle 21. The stopwheel 20 is in the form of a star with circular stops 50 having sealing faces 50.1 and engages wormwheel fashion with the rotor 14. The rotor 15 has a shaft 22 projecting beyond the housing 10. The space 12 has inlet openings 24, 24.1, 24.2 and 24.3, and has an outlet opening formed by the cavity 18 and opening 52.

Adjustability in the spacing between the rotational axes of the rotor and the stopwheel is obtainable by mounting the axle 21 of the stopwheel in a member 23 in the form of an eccentric bush. This bush is arcuately adjustable about its axis relative to the housing 10. After adjustment it is locked in position by a grub screw or other suitable means.

In operation, if a working fluid under pressure is admitted via one or other or more of the inlet openings 24, 24.1, 24.2 and 24.3, then the fluid will enter the chamber 60 defined by the groove profile, the stopface 50.1, and the recess 12 in the housing 10. The fluid pressure causes the rotor 14 to rotate, the device thus operates as a motor.

Alternatively, if the rotor 14 is driven, the device operates as a pump or compressor.

For better sealing, the sealing faces 50.1 of the stops 50 in FIG. 1 can be put in a plane substantially at right angles to the axis of the groove or thread 14.1.

In FIG. 1, inlet openings 24, 24.1, 24.2 and 24.3 are shown. Due to the different positions of the holes part-filling can be effected, for example, hole 24 gives 25% filling; hole 24+24.1 gives 50% chamber filling; hole 24+24.1+24.2 gives 75% filling, and hole 24+24.1 +24.2+24.3 gives 100% filling. That is, for 25% filling the inlet opening through the housing is closed off by the helical land 15 of the rotor next to the groove, as soon as 25% of the groove capacity has passed the stop. Expansion of the fluid under pressure then takes place until the beginning of the groove reaches the outlet opening whereupon after further rotation of the rotor, the fluid escapes. For 100% filling the inlet opening is closed off by the helical land before the beginning 14.2 of the groove reaches the outlet opening. More than 100% filling is not possible for, even if the groove were long enough, a condition would be obtained where the beginning of the groove is open to outlet while the other end of the groove is still open to the inlet, thus causing a direct communication between inlet and outlet, i.e. a "short" circuit. A control valve for the holes can be provided (not shown in the drawing) to effect part filling.

In FIG. 3, urging means in the form of screws 54 and balls 56 are shown which allow adjustment of the position of the stopwheel 20 relative to the housing 10. The urging means urges the sealing faces 50.1 of the stop 50 and the face 58 of the housing 10 into sealing engagement.

Referring to FIGS. 4 and 5 of the drawings, a further embodiment of the invention is shown in which reference numeral 10 refers to the housing defining a space 12 within which the disc-like rotor 14 is mounted to rotate about its axis 16. The rotor 14 has spiral grooves in the form of two-start spiral threads 14.5, spiralling about axis 16. These grooves 14.5 have run-out ends 14.51. The housing 10 also defines the cavity 18 within which the stopwheel 20 is mounted to rotate. The stopwheel 20 is in the form of a star with circular stops 50, that engage with the grooves 14.5 of the rotor 14. The rotor 14 has a shaft 22 projecting beyond the housing 10. The space 12 has inlet openings 24, 24.1, 24.2 and 24.3, and an outlet opening formed by a cavity 18 and the opening 52.

In FIG. 5, screws 54 and balls 56 are shown which allow adjustment of the position of stopwheel 20 relative to the housing 10 to allow optimum sealing engagement between the faces 50.1 of the stops 50 and the face 58 of the housing 10. In FIG. 4, rotor urging means in the form of screw 60 and ball 62 are shown which allow adjustment of the position of the rotor 14 relative to the housing 10. This urges the rotor face 64 into sealing engagement with the face 66 of the housing 10.

As with the embodiment of FIGS. 1, 2, and 3, the inlet openings 24, 24.1, 24.2 and 24.3 in FIGS. 4 and 5 provide part filling when a control valve (not shown in the drawing) for those openings is provided.

The operation of the embodiment of FIGS. 4 and 5 is similar to that of the embodiment of FIGS. 1, 2 and 3, and the device may thus operate as a motor or a pump.

If desired, two machines according to the invention may be used together to function as a prime mover.

Figure 6:
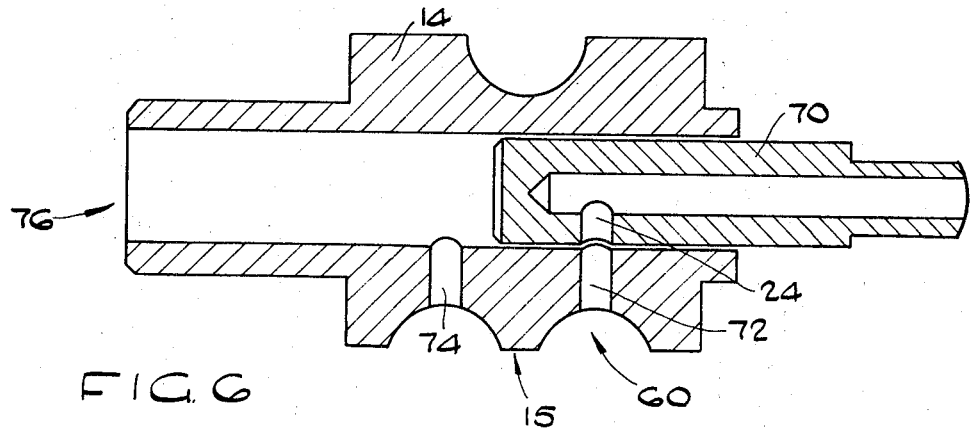
FIG. 6 shows a part sectional view of an alternative arrangement of the inlet and outlet openings.

Referring to FIG. 6 of the drawings, a part-sectional view of an alternative arrangement of the inlet and outlet openings is shown. Instead of having the inlet opening 24 on the outside of chamber 60 as shown in FIG. 3, the device of FIG. 6 has its inlet opening 24 in a stationary pipe 70, supported by the housing 10. A communicating passage 72 in the rotor 14 connects the pipe 70 to the groove 60. The outlet opening from the groove 60 is provided by the passages 74 and 76 in the rotor 14.

If desired, sealing means may be provided around the stationary pipe 70, spaced axially on either side of the passage 72.

Figure 7:
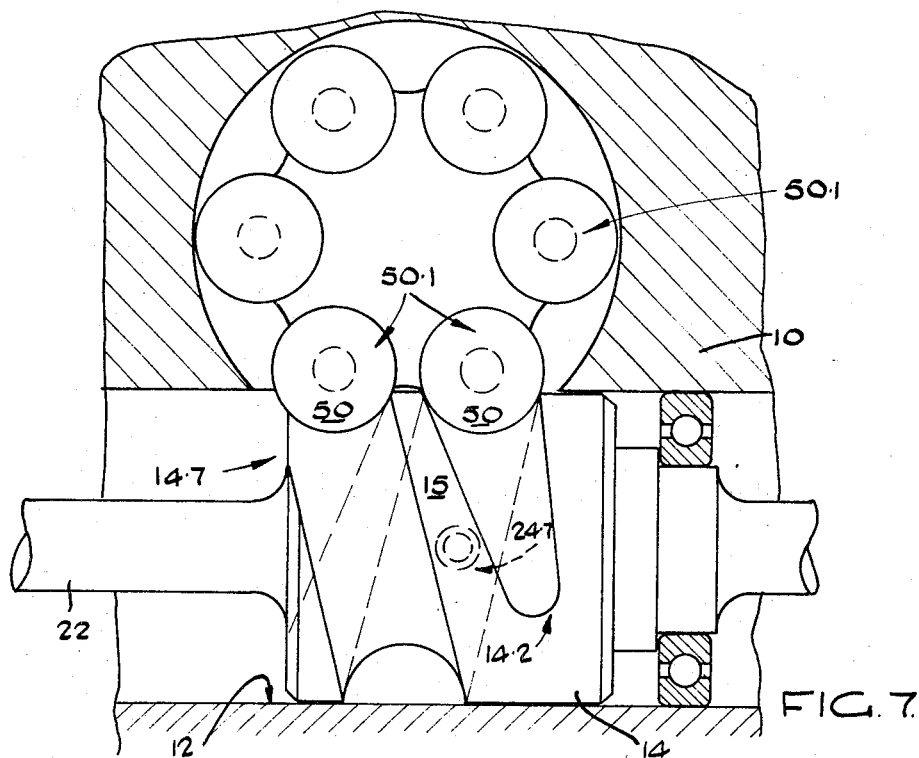
FIG. 7 shows a part side elevation of an embodiment whose rotor has an open-ended groove.

Referring now to FIG. 7 of the drawings. This drawing shows the rotor 14 having a groove 14.1 which has one run-out end 14.2 and having an open end 14.7 This drawing does not show the sealing face of the housing with which the stops are to co-operate sealingly. The open end 14.7 of the groove 14.1 communicates with the bore 12 which constitutes one of the openings in the housing 10. The opening 24.7 constitutes the other opening.

Figure 8:
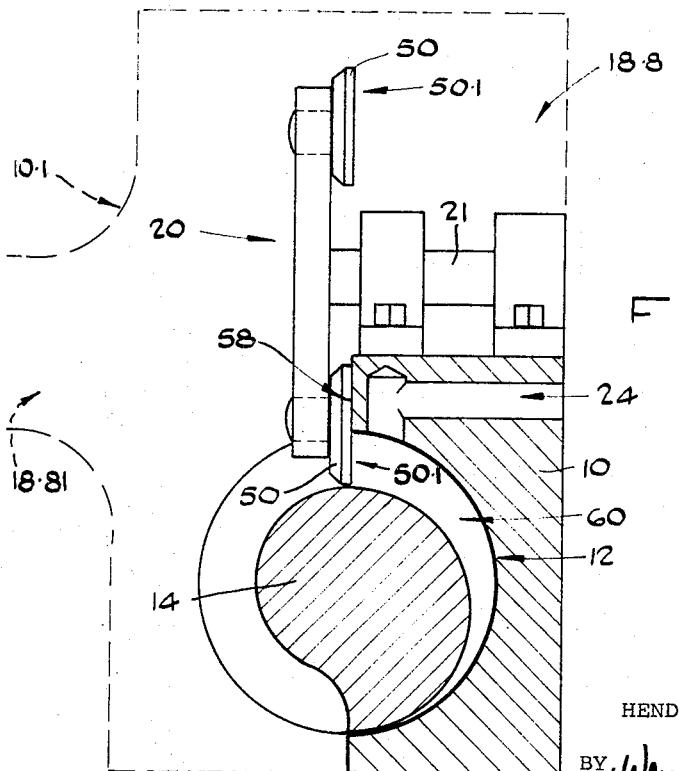
FIG. 8 shows a part end elevation of the invention in its broadest form.

FIG. 8 shows the broad concept of the invention, in which the housing 10 has a recess 12 rotatably supporting the rotor 14. The stopwheel is mounted rotatably in a space 18.8 which may be on the outside of the housing 10. If desired, however, it may be enclosed as shown by the dotted line 10.1. The space 18.8 constitutes the one opening in the housing 10. When the space 18.8 is enclosed as shown by 10.1, then the opening is provided by opening 18.81.

By way of explanation, in the specification and claims by the rotor groove having a "run-out end" is meant that the end of the groove runs out against a sealing surface. Accordingly, when the groove has an "open end" then that end is not sealed by a sealing surface.

What I claim is:

1. A rotary positive displacement device which includes a housing having an inlet opening and an outlet opening; a rotor rotatably mounted relative to the housing and having at least one groove which has at least one run-out end, the rotor engaging sealingly with the housing along either side of the groove and at the run-out end of the groove; and a stop assembly displaceably mounted relative to the housing and having a plurality of spaced stops; and said groove being adapted when the rotor rotates to come cyclically into communication with at least one of the openings; and a free passage for fluid flow along the groove from one opening to the other being prevented when the rotor rotates relative to the housing by the stops engaging sealingly with the groove profile and on one side with a single sealing face of the housing, the stops being mounted in a space which has unrestricted communication with one of the openings.

2. A device according to claim 1, in which the free passage is also prevented by the groove being arranged to come out of register with one of the openings before it registers with the other of the said openings.

3. A device according to claim 1, in which the stop assembly is a stopwheel rotatably mounted relative to the housing in the said space, the stops being circumferentially spaced on the stopwheel.

4. A device according to claim 1, in which the said space constitutes the said one of the openings with which it communicates.

5. A device according to claim 3, in which the said space is a cavity in the housing, and in which the communication of the said space with the said one of the openings in the housing is via the groove.

6. A device according to claim 1, in which the groove has a run-out end at its other end as well, the rotor engaging sealingly with the housing also at this run-out end of the groove further to prevent free passage of fluid flow between the openings.

7. A device according to claim 1, in which the groove is open-ended at its other end, the said open end of the groove terminating in an opening in the housing which is the said one of the openings in the housing communicating with the said space.

8. A device according to claim 1, in which the opening other than the one communicating with the space, is adjustable in position relative to the groove to permit variation in the timing of the registration of the groove with one of the openings relative to the other of the openings.

9. A device according to claim 8, in which the adjustability in position of the opening is provided by having a plurality of openings spaced apart and usable as alternatives.

10. A device according to claim 3, in which good sealing to ensure prevention of a free passage for fluid flow from one opening to another, is obtained by making the stopwheel adjustable in position relative to the housing.

11. A device according to claim 10, in which the adjustability is obtained by making the spacing between the rotor and stopwheel adjustable.

12. A device according to claim 10, in which the adjustability is provided by urging means adapted to urge the stopwheel axially relative to the housing.

13. A device according to claim 1, in which the groove is one of the group helical, spiral, and spiro-helical.

14. A device according to claim 3, in which the groove is at least partly of a spiral type, and in which good sealing between rotor and housing to ensure prevention of a free passage for fluid flow from one opening to another, is obtained by urging the rotor axially relative to the housing.

15. A device according to claim 1, in which the stops are replaceable inserts.

References Cited

UNITED STATES PATENTS

| | | | |
|---|---|---|---|
| 1,367,801 | 2/1921 | Clark | 103—125 |
| 1,909,418 | 5/1933 | Norwood. | |
| 1,989,552 | 1/1935 | Good | 103—125 |
| 2,158,933 | 5/1939 | Good | 230—150 |

MARK M. NEWMAN, Primary Examiner

W. J. GOODLIN, Assistant Examiner

U.S. Cl. X.R.

418—109, 195